United States Patent [19]

Moritani

[11] Patent Number: 5,299,870
[45] Date of Patent: Apr. 5, 1994

[54] TEMPERATURE DETECTING DEVICE FOR HEATED ROTARY MEMBER

[75] Inventor: Toshifumi Moritani, Yokohama, Japan

[73] Assignee: Canon Kabushiki Kaisha, Tokyo, Japan

[21] Appl. No.: 836,973

[22] Filed: Feb. 19, 1992

[30] Foreign Application Priority Data

Feb. 21, 1991 [JP] Japan .................. 3-047297

[51] Int. Cl.$^5$ ........................... G01K 13/08
[52] U.S. Cl. ........................ 374/153; 374/208
[58] Field of Search ............ 374/153, 208, 164, 31; 219/216

[56] References Cited

U.S. PATENT DOCUMENTS

| | | | |
|---|---|---|---|
| 3,852,570 | 12/1974 | Tyler | 338/287 X |
| 3,888,622 | 6/1975 | Thettu | 374/153 X |
| 4,144,835 | 3/1979 | Fukase et al. | 219/216 X |
| 4,167,116 | 9/1979 | Hager, Jr. | 374/31 X |
| 4,419,023 | 12/1983 | Hager, Jr. | 374/208 X |
| 4,565,455 | 1/1986 | Bloore et al. | 374/164 |
| 5,007,742 | 4/1991 | Usui et al. | 374/153 X |
| 5,073,799 | 12/1991 | Watanabe | 355/285 |
| 5,123,752 | 6/1992 | Paz-Pujalt et al. | 374/153 |

FOREIGN PATENT DOCUMENTS 56-1323  1/1981  Japan .

*Primary Examiner*—Daniel M. Yasich
*Attorney, Agent, or Firm*—Fitzpatrick, Cella, Harper & Scinto

[57] ABSTRACT

The present invention relates to a temperature device for a heated rotary member. The device has a temperature detecting element, a supporting member for support it, and an electrically insulating tape for covering the support member and temperature detecting element. The insulating tape is wound in the direction along the rotating axial direction of the heated rotary member.

9 Claims, 4 Drawing Sheets

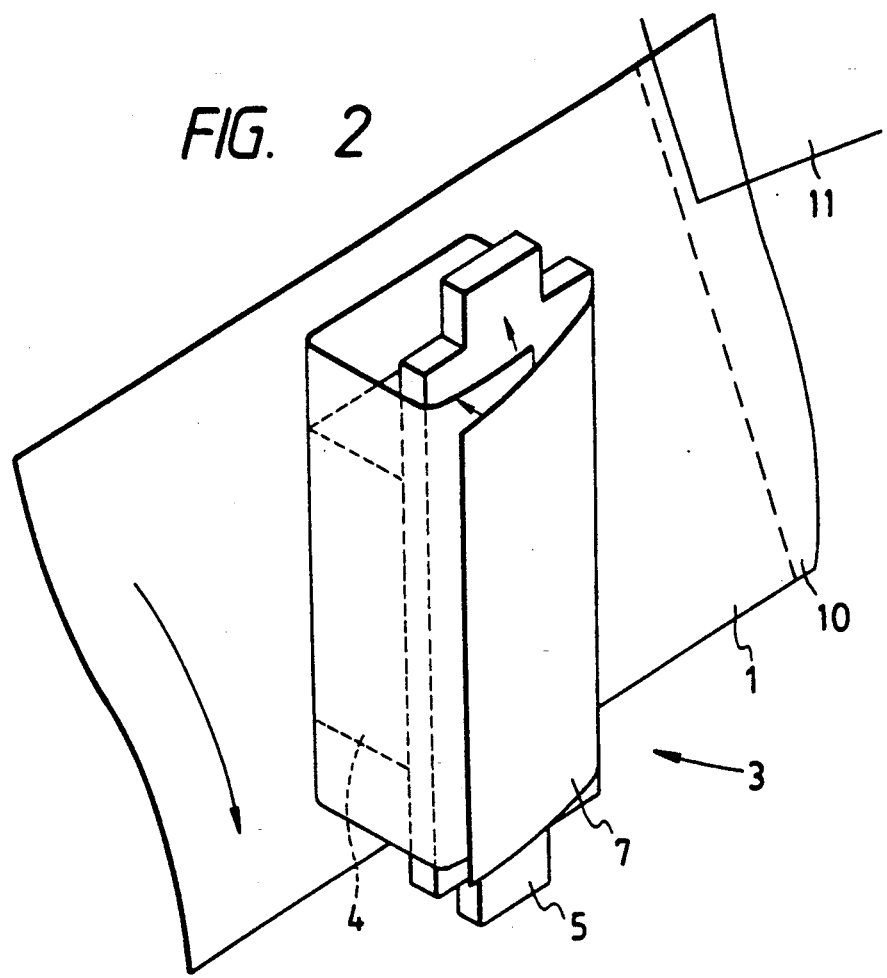

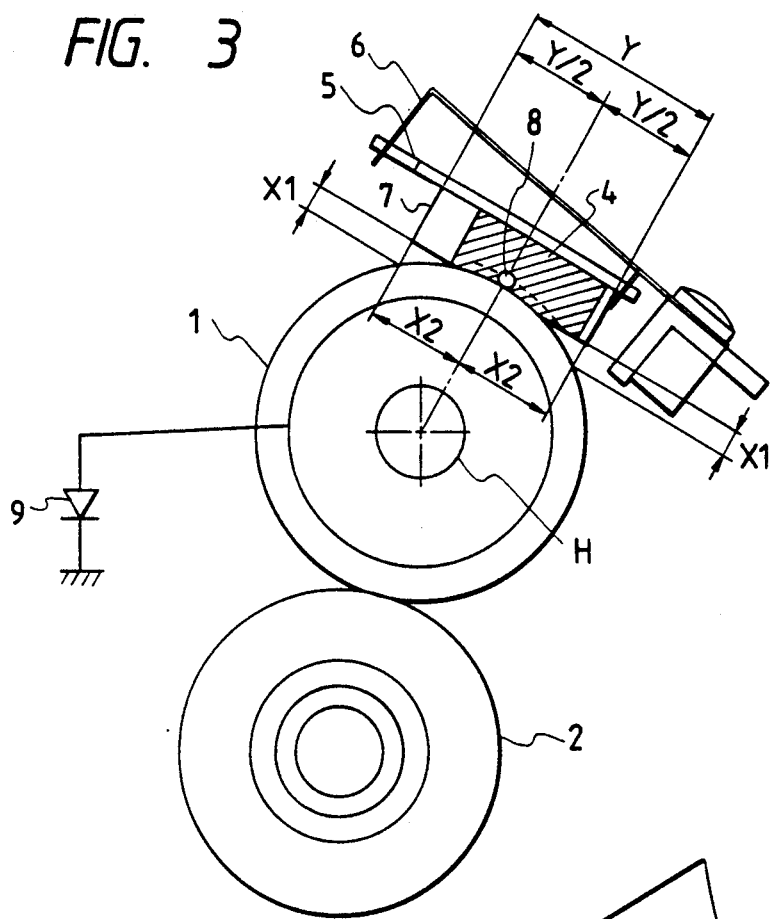
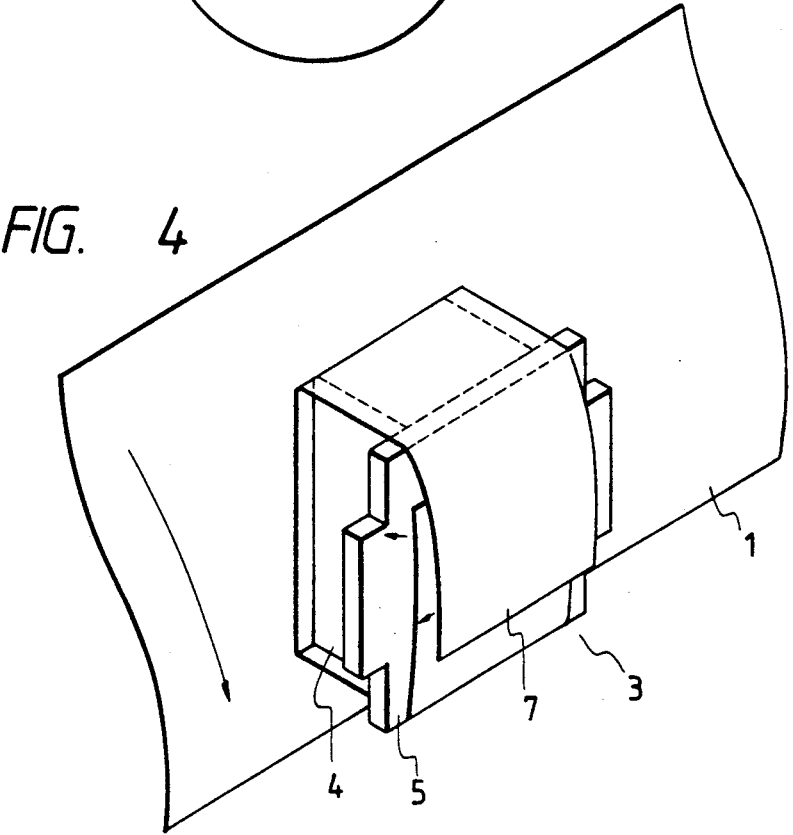

TEMPERATURE DETECTING DEVICE FOR HEATED ROTARY MEMBER

BACKGROUND OF THE INVENTION

1. Field of the Invention

The present invention relates to a temperature detecting device for a heated rotary member, adapted for use in an image fixing device of an image forming apparatus such as an electrophotographic apparatus or an electrostatic recording apparatus.

2. Related Background Art

An image fixing device, employing a heating roller heated by a heater, is widely used in image forming apparatus such as a copying machine or a laser beam printer.

FIG. 5 is a cross-sectional view of an example of the thermal fixing device, wherein provided are a heating roller 1 with a therein; a pressure roller 2; a temperature detecting device 8 for detecting the temperature of said heating roller 1; and a plate spring for maintaining the temperature detecting device in contact with the heating roller 1.

FIG. 4 is a magnified view of the heating and pressure rollers and the temperature detecting device, wherein, on an electric circuit board 5, there is adhered rubber sponge 4 in which a thermistor is embedded and which is covered by an insulation tape 7, wound in the circumferential direction of the heating roller. Such device, however, may show significant deformation of the sponge 4 as shown in FIG. 6, whereby the temperature detecting element 3, such as a thermistor, is displaced from the designed position. Consequently, the detecting element 3 may lose contact with the heating roller 1 or may contact said roller with a pressure lower than the designed value, thereby making precise temperature detection difficult.

Recently, it is considered to apply a bias voltage to the heating roller, in order to prevent toner offsetting in electrostatic manner. It is however difficult to maintain a sufficient circumferential distance between the surfacial position of the heating roller where said bias voltage is applied and the thermistor.

SUMMARY OF THE INVENTION

An object of the present invention is to provide a temperature detecting device, for a heated rotary member, realizing reduced deformation and a higher precision of temperature detection.

Another object of the present invention is to provide a temperature detecting device, for a heated rotary member, allowing to ensure a large distance along the insulator surface between the surface of said heated rotary member and the temperature detecting element.

Still another object of the present invention is to provide a temperature detecting device, for a heated rotary member, wherein an insulation tape covering a support member for supporting a temperature detecting member is wound in a direction along the rotating axial direction of said heated rotary member.

Still other objects of the present invention will become fully apparent from the following description.

BRIEF DESCRIPTION OF THE DRAWINGS

FIG. 2 is a magnified partial perspective view of the embodiment shown in FIG. 1;

FIG. 3 is a cross-sectional view of another embodiment of the present invention;

FIG. 4 is a perspective view of a temperature detecting device in the background art of the present invention;

DETAILED DESCRIPTION OF THE PREFERRED EMBODIMENTS

Figure 1:
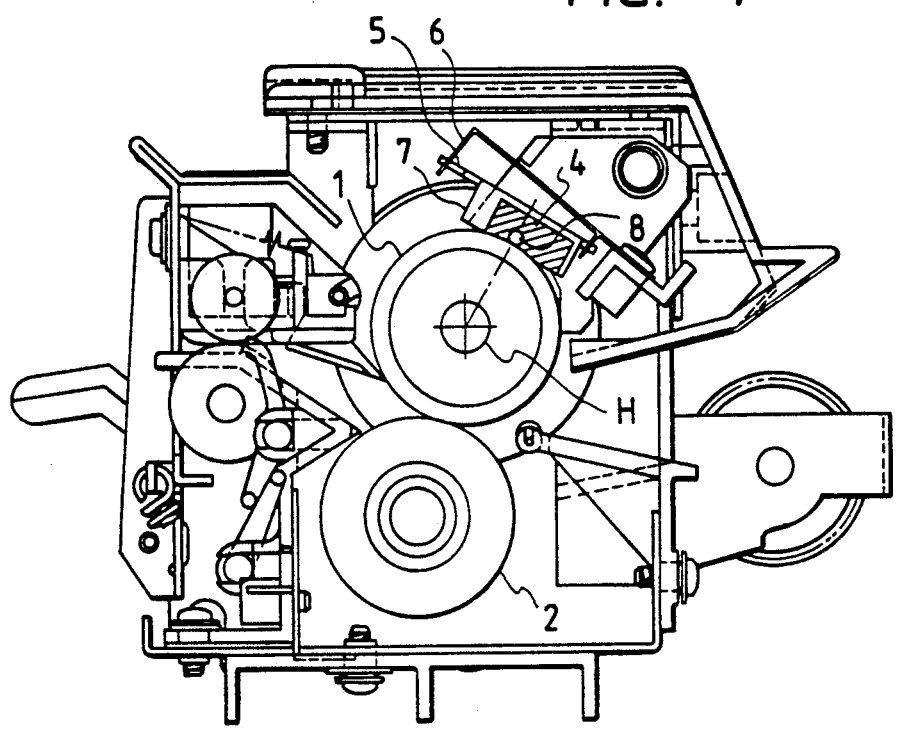
FIG. 1 is a cross-sectional view of an embodiment of the present invention.
Figure 5:
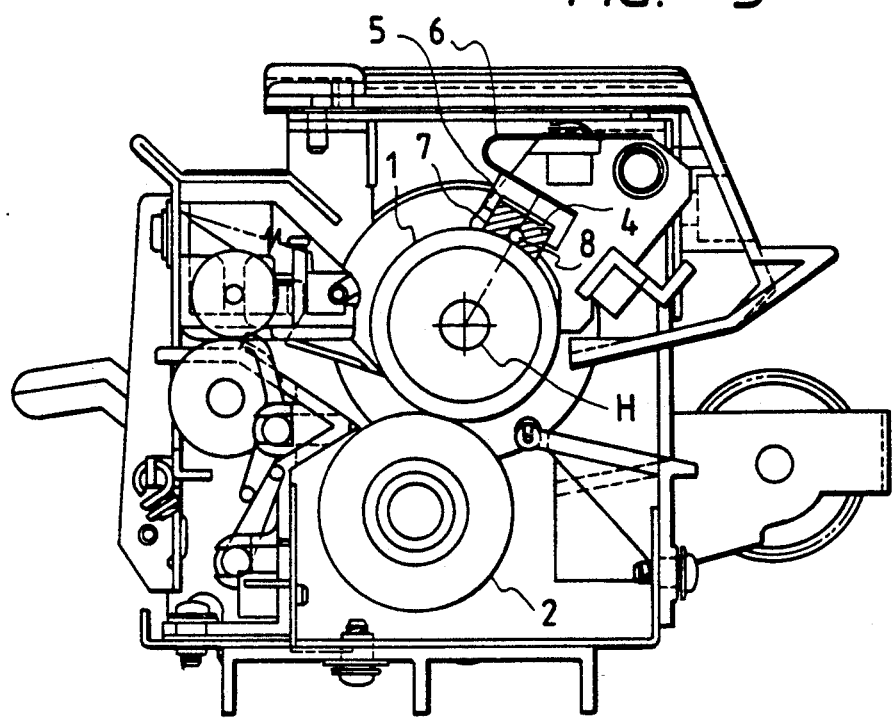
FIG. 5 is a cross-sectional view of a fixing device in the background art of the present invention.
Figure 6:
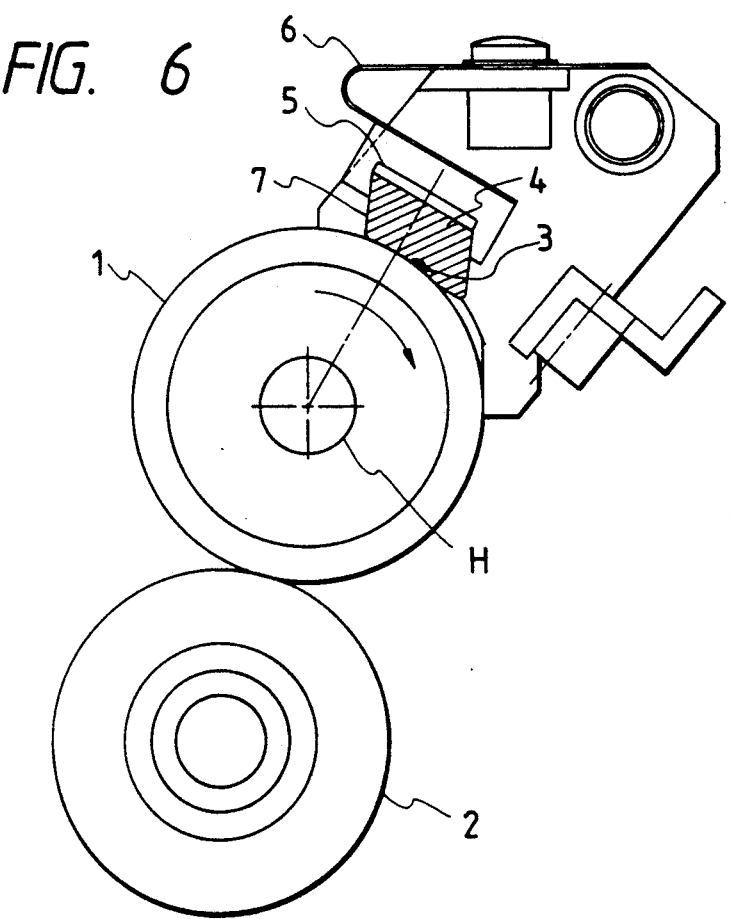
FIG. 6 is a view showing the drawback of the device shown in FIG. 5.

FIGS. 1 and 2 are respectively a cross-sectional view and a magnified partial perspective view of a first embodiment of the present invention.

Referring to FIGS. 1 and 2, a fixing roller (heating roller) 1 is provided therein with a heater H constituting a heat source. Under fixing roller 1 there is provided a pressure roller 2 rotating in pressure contact with fixing roller 1. Also on fixing roller 1, a temperature detecting device 3 for detecting the temperature of said fixing roller 1 is maintained in contact therewith.

The power supply to said heater H controlled so that the temperature detected by said temperature detecting device is maintained at a predetermined fixing temperature.

An unfixed toner image, borne by a recording material, is fixed by heat and pressure while said recording material is pinched and transported by the fixing roller and the pressure roller.

The temperature detecting device 3 includes a thermistor (temperature detecting element) 8, rubber sponge (support member) 4 into which said thermistor 8 is surfacially embedded by pressure, a board 5 on which the rubber sponge 4 is mounted, and an electrically insulating tape 7 consisting of insulating resin such as polyimide and covering said rubber sponge 4, together with the thermistor 8 and the board 5. The board 5 impinges on a plate spring 6 for maintaining the temperature detecting device 3 in contact at the fixing roller 1 with a predetermined pressure.

The temperature detecting device 3 is placed on the rubber sponge 4, and is fixed thereto, together with the board 5, by being wound by the electrically insulating tape 7. As shown in FIG. 2, said electrically insulating tape 7 is wound in a direction along the axial direction of the fixing roller 1, so that, when said fixing roller 1 is rotated, the sponge 4 or the electrically insulating tape 7 is scarcely deformed by traction in the rotating direction. Thus, the temperature detecting device 3 can be securely maintained in contact with the surface of the fixing roller 1 under the designed contact pressure. FIG. 2 also shows the placement of the temperature detecting device 3 outside of the recording material image area 10, where recording material 11, bearing an image thereon, contacts the surface of fixing roller 1.

FIG. 3 is a cross-sectional view showing another embodiment of the present invention.

In the present embodiment, the core of the fixing roller 1 is grounded through a diode 9. Since said diode 9 is directed so as to maintain the charge of a polarity the same as that of toner, the fixing roller 1 is given a bias voltage of a polarity the same as that of the toner, due to a charge generated by frictional charging.

The distance X along the insulator surface, required between the thermistor and the fixing roller 1 in response to the maximum voltage applied by the diode 9 to the fixing roller 1 and in consideration of the requirements of electrical safety standards such as UL standard, is represented by (X1+X2). Also Y indicates the dimension of the insulation tape in the tangential direction of the fixing roller, and said insulating tape is so provided as to provide on both sides of the support member 4.

In the present embodiment, said dimension Y is selected so as to satisfy the requirements of said electrical safety standards, and to satisfy a condition Y>X. Consequently, since the requirements of the electrical safety standards can be satisfied without increasing the contact width in the electrically axial direction between the insulating tape 7 and the fixing roller 1, it is rendered possible limit the width of the scars caused by frictional contact of the electrically insulating tape 7 on the fixing roller 1.

Besides, in the present embodiment, the temperature detecting device 3 is maintained in contact with the fixing roller 1 outside the recording material image area 10, namely outside the axial range of the fixing roller coming into contact with the image borne on the recording material 11, in order to prevent frictional scars within said image area.

Furthermore, since the present embodiment can reduce the contact width of the temperature detecting device in the non-image area, the entire apparatus does not become bulky though said device is maintained in contact in such non-image area.

An exclusive bias voltage source may be employed for applying the bias voltage to the fixing roller 1.

The present invention is not limited by the foregoing embodiments but is subject to various modifications within the scope and spirit of the appended claims.

What is claimed is:

1. A temperature detecting device for use with a heated rotary member, said temperature detecting device comprising:
    a resilient support member;
    a temperature detecting element embedded in and supported by said resilient support member; and
    an electrically insulating tape for covering said resilient support member and temperature detecting element,
    wherein said electrically insulating tape is wound in the direction along the rotating axial direction of said heated rotary member.

2. A temperature detecting device according to claim 1, wherein said support member is composed of an elastic member.

3. A temperature detecting device according to claim 2, further comprising a substrate member for supporting said elastic member, wherein said electrically insulating tape covers said elastic member together with said substrate member.

4. A temperature detecting device according to claim 1, wherein said temperature detecting device is adapted to be maintained in contact with the circumferential surface of said heated rotary member.

5. A temperature detecting device according to claim 4, further comprising a pressurizing member for maintaining said device in pressurized contact with said heated rotary member.

6. A temperature detecting device according to claim 4, wherein said electrically insulating tape is extended from said support member.

7. A temperature detecting device according to claim 6, further comprising means for applying a voltage to said heated rotary member.

8. A temperature detecting device according to claim 7, wherein said heated rotary member is grounded through a diode.

9. A temperature detecting device according to claim 1, wherein said heated rotary member is employed in a fixing device for pinching and transporting a recording material bearing an image thereon, for the purpose of fixing said image to said recording material, and said temperature detecting device is maintained in contact with said heated rotary member outside an image area thereof.

* * * * *

UNITED STATES PATENT AND TRADEMARK OFFICE
CERTIFICATE OF CORRECTION

PATENT NO. : 5,299,870
DATED : April 5, 1994
INVENTOR(S) : TOSHIFUMI MORITANI

It is certified that error appears in the above-indentified patent and that said Letters Patent is hereby corrected as shown below:

On the Title Page, item 57:
Line 4, "for" should read --to--.

Column 1,
Line 20, "a therein;" should read --a heater H therein;--.

Column 3,
Line 16, "possible" should read --possible to--.

Signed and Sealed this

Twenty-third Day of August, 1994

Attest:

BRUCE LEHMAN

Attesting Officer          Commissioner of Patents and Trademarks